United States Patent Office 3,487,128
Patented Dec. 30, 1969

3,487,128
BLENDS COMPRISING POLYPROPYLENE, POLY-
ETHYLENE, AND AN ETHYLENE-PROPYLENE
BLOCK COPOLYMER
Masao Okazaki, Ashiya-shi, Atsuo Mori, Hirakata-shi,
Namihiro Toda, Takarazuka-shi, and Isao Hara,
Niihama-shi, Japan, assignors to Sumitomo Chemical
Company, Ltd., Osaka, Japan, a corporation of Japan
No Drawing. Filed Jan. 30, 1967, Ser. No. 612,318
Claims priority, application Japan, Jan. 31, 1966,
41/5,755
Int. Cl. C08f 29/12
U.S. Cl. 260—876                                    4 Claims

ABSTRACT OF THE DISCLOSURE

An improved polypropylene composition excellent in impact strength and transparency consisting of a substantially crystalline polypropylene having at least 50% by weight of an isotactic portion, a small amount of polyethylene and a heptane soluble black copolymer of ethylene and propylene.

Originally, commercial polypropylene, i.e. substantially crystalline polypropylene having at least 50% by weight of an isotactic portion, is a thermoplastic resin excellent in tensile strength, rigidity and thermal resistance, but is insufficient in impact strength and hence is desired to be improved particularly in low temperature impact strength.

For the improvement in impact strength of crystalline polypropylene, there have been proposed processes in which the crystalline polypropylene was blended with natural rubber or various synthetic rubbers as seen in, for example, Japanese patent publication Nos. 2,245/59, 7,088/60, 10,640/60, 10,341/61, 8,717/62 and 2,126/63. Further, there have been known processes in which the crystalline polypropylene was blended with polyethylene as disclosed in Japanese patent publication Nos. 12,786/61, 12,787/61, 6,975/62 and 15,067/63. However, in the case of these binary mixtures containing crystalline polypropylene as a base, the effect of improving the impact strength of crystalline polypropylene, which is greatly dependent upon the mixed state, was difficultly attainable due to low compatibility of the mixed natural or synthetic rubbers or polyethylene. In case a sufficient impact strength-improving effect was desired to be attained, rubbery substances or polyethylene were required to be incorporated in large quantities with the result that excellent properties inherent to polypropylene, such as rigidity, thermal resistance and transparency, were lowered. Therefore, the above processes were not always said to be satisfactory.

As other processes for improving the impact strength of crystalline polypropylene, there have been adopted, in addition to the so-called "polymer blend" processes mentioned above, block copolymerization processes, e.g. processes in which propylene was copolymerized with ethylene (Japanese patent publication Nos. 21,493/63 and 1,836/64). However, block copolymers obtained according to such processes had a certain limit in the improvement in impact strength, and did not always give satisfactory values.

In view of the above, there has been proposed, like the composition as disclosed in, for example, Japanese patent publication No. 18,746/64, a ternary composition consisting of polypropylene, a high density polyethylene and an ethylene-propylene copolymer having an ethylene content of 25–95% by weight. The ethylene-propylene copolymer referred to in the above is, according to the description of said patent publication, a substantially amorphous ethylene-propylene copolymer. In this case an impact strength was improved, but a transparency was lowered, therefore this process was not always said to be satisfactory.

The present inventors have found that a composition not only equal to or more excellent than the above-mentioned composition in impact strength but prominent in transparency can be obtained by kneading polypropylene, in a weight ratio regulated later, with polyethylene and an ethylene-propylene copolymer which is a polymerization solvent-soluble portion having an ethylene content of 2–20% by weight in the production of block-copolymer of ethylene and propylene.

In this case a particularly marked improvement in transparency is observed when a low density polyethylene is used as the polyethylene.

An object of the present invention is to improve at a markedly low cost the impact strength of normally solid crystalline polypropylene by use of an ethylene-propylene copolymer formed as a polymerization solvent-soluble by-product during the preparation of a specific crystalline ethylene-propylene block copolymer.

In accordance with the present invention, there is provided a polypropylene composition comprising 65–96% by weight of crystalline polypropylene having at least 50% by weight of an isotactic portion, 2–30% by weight of normally solid polyethylene and 2–30% by weight of an ethylene-propylene copolymer having an ethylene content of 2–20% by weight and a crystallization degree of 5–40% by weight which is obtained as a polymerization solvent-soluble by-product in the case where propylene is subjected to stereoregular polymerization in the presence of a Ziegler-Natta coordination catalyst, and at the latter stage of said polymerization, ethylene or a mixed gas of ethylene and propylene is introduced to form the block-copolymer.

Polypropylene usable in the present invention is substantially crystalline polypropylene containing at least 50% by weight of an isotactic portion which is prepared in the presence of a Ziegler-Natta coordination catalyst, and is one having a melt index of 0.1–10 at 230° C. under a load of 2.16 kg.

The amount of such polypropylene to be contained in the ternary composition of the present invention is 65–96%, preferably 70–90%, by weight based on the amount of the composition. In case the amount of polypropylene is less than 65% by weight, aforesaid excellent properties inherent to the polypropylene are greatly lowered due to increase in incorporated amounts of the other two components, polyethylene and ethylene-propylene copolymer. On the other hand, in case the amount of polypropylene is more than 96% by weight, the impact resistance-improving effect of polyethylene and ethylene-propylene copolymer undesirably becomes little due to decrease in incorporated amounts of said components.

Polyethylene usable in the present invention may be any of low density or high density polyethylene, and one having a melt index of 0.1–40 at 190° C. under a load of 2.16 kg. is effective. Particularly preferably polyethylene is low density polyethylene. The amount of such polyethylene to be contained in the composition of the present invention is 2–30%, preferably 5–15%, by weight based on the amount of the composition.

Ethylene-propylene copolymer usable in the present invention is as mentioned before. Concretely, such copolymer is one which is soluble in hot n-heptane at, the polymerization solvent, but has a crystallization degree within the range of 5–40% by weight when measured according to G. Natta et al., method disclosed in "Chemical Abstracts," vol. 52, 17789 f (1958). The intrinsic viscosity of the copolymer should be more than 1 in tetralin solution at 135° C. In case the intrinsic viscosity is lower than 1, the impact resistance-improving effect of the copolymer in the present ternary composition is undesirably low. The amount of such ethylene-propylene copolymer to be contained in the present composition is 2–30%, preferably 5–15%, by weight based on the amount of the composition.

The ratio of polyethylene to said ethylene-propylene copolymer in the present ternary compositon is desirably about 1:1 by weight when the synergistic effect thereof on the impact resistance improvement is particularly required. The present compositions containing said components in such a weight ratio show a maximum value in impact resistance, particularly in low temperature impact strength measured according to the Bell brittleness temperature test.

According to the improvement of the present invention, for instance, the impact strength of polypropylene composition measured by ASTM D–256 method is raised from 3.5 kg. cm./cm.$^2$ to above 10 kg. cm./cm.$^2$ at 23° C., and the Bell brittle temperature measured by ASTM D–746 method is lowered from 37.5° C. to below −10° C. Further the polypropylene composition improved according to the present invention is equal to or more excellent than the employed polypropylene itself in a transparency, and other properties of polypropylene such as a tensile strength and heat deflection temperature of the improved polypropylene composition does not become undesirable for the use thereof and the improved polypropylene composition may be applied to more various purposes than polypropylene.

If necessary, the present compositions may be incorporated, depending on uses thereof, with various additives such as stabilizers, antiblocking agents, processing additives, antistatic agents, nucleating agents, pigments and inorganic fillers.

By adoption of various molding procedures such as extrusion-, injection-, compression- and blow-molding, the present compositions are formed into pipes, containers and the like molded articles and film and are useful for a variety of uses where impact resistance is particularly required.

DESCRIPTION OF THE PREFERRED EMBODIMENT

The following examples illustrate the present invention but should not be construed as limiting the scope of the invention.

Example 1

Using a two-roll mill maintained on the roll surface at 180° C., a fixed amount of polypropylene having a melt index of 3.4 g./10 min. (at 230° C. under a load of 2.16 kg.) and an isotactic index of 91.8% was thoroughly masticated. Subsequently, a fixed amount of low density polyethylene having a density of 0.920 and a melt index of 7.0 (at 190° C. under a load of 2.16 kg.) and a fixed amount of the ethylene-propylene copolymer described in the specification, having an ethylene content of 5% by weight, an intrinsic viscosity of 2.7 as measured in tetraline solution at 135° C., and a crystallization degree of 23% by weight were added to and kneaded with said polypropylene at said roll temperature for about 10 minutes. The kneaded composition was then compression-molded by means of a hot press at 210° C. and was formed into sheets for measuring the physical properties of the composition, i.e., Bell brittle temperature (according to ASTM D–746 method), impact strength (according to ASTM D–256 method). The results obtained were as shown in Table 1.

TABLE 1

| Run No.: | Composition (wt. percent) | | | Brittle temp. (° C.) | Impact strength (with notch) (at 23° C.) (kg. cm./cm.$^2$) |
| --- | --- | --- | --- | --- | --- |
| | Polypropylene | Polyethylene | Ethylene propylene copolymer | | |
| ($^1$) | 100 | 0 | 0 | 37.5 | 3.5 |
| ($^1$) | 90 | 10 | 0 | 31.5 | 5.0 |
| 1 | 90 | 5 | 5 | 10.3 | 6.7 |
| ($^1$) | 90 | 0 | 10 | 6.2 | 6.8 |
| ($^1$) | 80 | 20 | 0 | 23.5 | 4.3 |
| 2 | 80 | 14 | 6 | −0.3 | 7.9 |
| 3 | 80 | 10 | 10 | −10.0 | 9.7 |
| 4 | 80 | 6 | 14 | −7.5 | 10.6 |
| ($^1$) | 80 | 0 | 20 | −1.5 | 9.2 |
| ($^1$) | 70 | 30 | 0 | 20.8 | 4.9 |
| 5 | 70 | 15 | $^2$15 | −17.0 | 14.5 |
| ($^1$) | 70 | 0 | $^2$30 | −20.0 | 14.3 |
| ($^1$) | 60 | 20 | 20 | −20.3 | 18.6 |

$^1$ Control.
$^2$ Ethylene content 8.2% by weight, crystallization degree 34%.

As seen in the above table, it is clear that the incorporated low density polyethylene and amorphous ethylene-propylene copolymer act synergistically on the improvement in impact resistance, particularly in low temperature impact resistance, of crystalline polypropylene, and are markedly effective for the improvement.

Example 2

The same polypropylene and ethylene-propylene copolymer as used in Example 1, and high density polyethylene (trade name Hizex 1000–J) having a density of 0.960 and a melt index of 6.50 (at 190° C. under a load of 2.16 kg.) were kneaded in the same manner as in Example 1. Thereafter, the same operations as in Example 1 were effected to measure various physical properties of so-called polypropylene-high density polyethylene-ethylene-propylene copolymer system ternary mixtures. The results obtained were as shown in Table 2.

TABLE 2

| Run No.: | Composition (wt. percent) | | | Brittle temp. (° C.) | Impact strength (with notch) (at 23° C.) (kg. cm./cm.$^2$) |
| --- | --- | --- | --- | --- | --- |
| | Polypropylene | Polyethylene | Ethylene propylene copolymer | | |
| ($^1$) | 100 | 0 | 0 | 37.5 | 3.5 |
| ($^1$) | 90 | 10 | 0 | 29.5 | 4.6 |
| 1 | 90 | 5 | 5 | 7.0 | 6.1 |
| ($^1$) | 90 | 0 | 10 | 8.0 | 6.7 |
| ($^1$) | 80 | 20 | 0 | 43.5 | 3.7 |
| 2 | 80 | 14 | 6 | 0.5 | 8.6 |
| 3 | 80 | 10 | 10 | −7.0 | 9.9 |
| 4 | 80 | 6 | 14 | −9.5 | 11.4 |
| ($^1$) | 70 | 30 | 0 | 40.0 | 3.3 |
| 5 | 70 | 15 | 15 | −15.5 | 14.9 |
| ($^1$) | 70 | 0 | 30 | −18.5 | 13.9 |
| ($^1$) | 60 | 20 | 20 | −16.6 | 16.4 |

$^1$ Control.

The results obtained in this example are substantially the same as in the case of the polypropylene-low density polyethylene-ethylene-propylene copolymer system ternary composition shown in Example 1. It is evident that the high density polyethylene and ethylene-propylene copolymer synergistically act on the improvement in impact resistance, particularly in low temperature impact resistance, of polypropylene.

Example 3

The same polypropylene and ethylene-propylene copolymer as used in Example 1 and low density polyethylenes different in molecular weight were kneaded in the same manner as in Example 1. The resulting compositions were subjected to measurement in impact strength and Bell brittle temperature. The results are shown in Table 3.

TABLE 3

| Composition (wt. percent) | | | Brittle temp. (° C.) | Impact strength (with notch) (at 23° C.) (kg. cm./cm.²) |
|---|---|---|---|---|
| Polypropylene | Polyethylene (melt index) | Ethylene-propylene copolymer | | |
| 100 (control) | 0 | 0 | 37.5 | 3.5 |
| 80 | 10(0.3) | 10 | −6.0 | 9.9 |
| 80 | 10(2.0) | 10 | −8.5 | 10.3 |
| 80 | 10(7.0) | 10 | −10.0 | 9.7 |
| 80 | 10(20.0) | 10 | −6.5 | 9.2 |
| 80 | 10(40.0) | 10 | −5.0 | 8.9 |

Table 3 shows that low density polyethylenes have effects on the present compositions over a relatively wide molecular weight range.

EXAMPLE 4

Crystalline polypropylene having a melt index of 0.9 g./10 min. (at 230° C. under a load of 2.16 kg.) was kneaded by means of a high speed, blade-type mixer with low density polyethylene having a density of 0.922 and a melt index of 7.0 (at 190° C. under a load of 2.16 kg.) or high density polyethylene having a density of 0.955 and a melt index of 2.0 and the ethylene-propylene copolymer employed in Example 1, so that the weight ratio of polyethylene to ethylene-propylene copolymer became 1:1 and the total amount of said two components, including an ordinary stabilizer, became 30% by weight based on the amount of the resulting composition. Subsequently, the mixture was introduced into a Vent type extruder of 65 mm. in diameter and was extrusion-kneaded at 210° C. The resulting compositions A and B were measured in physical properties to obtain the results as shown in Table 4.

As seen in Table 4, the compositions A and B, particularly A, are not only excellent in impact strength as compared with the control compositions C, D and E, but show markedly excellent results in transparency represented by haze value.

We claim:

1. A polypropylene composition which consists of (1) 2–30% by weight of an ethylene-propylene black copolymer having an intrinsic viscosity of more than 1 as measured in tetralin at 135° C., and having an ethylene content of 2–20% by weight and a crystallization degree of 5–40% by weight, said copolymer being formed as a heptane soluble portion by subjecting propylene to stereoregular polymerization in the presence of a Ziegler-Natta coordination catalyst and then introducing ethylene or a mixed gas of ethylene and propylene at the latter stage of the polymerization to form a block-copolymer, (2) 65–96% by weight of a crystalline polypropylene having at least 50% by weight of an isotactic portion and a melt index of 0.1–10 at 230° C. under a load of 2.16 kg. and (3) 2–30% by weight of normally solid polyethylene having a melt index of 0.1 to 40 at 190° C. under a load of 2.16 kg.

2. A polypropylene composition according to claim 1, wherein the composition comprises 5–15% by weight of said ethylene-propylene copolymer, 70–90% by weight of said polypropylene and 5–15% by weight of said polyethylene.

3. A polypropylene composition according to claim 1 wherein the polyethylene and the ethylene-propylene copolymer are in a weight ratio of about 1:1.

4. A polypropylene composition according to claim 1 wherein the polyethylene is low density polyethylene.

TABLE 4

| Measured item, unit | Compositions | | | | |
|---|---|---|---|---|---|
| | A | B | C | D | E |
| Haze value, percent (ASTM D-1003-52) | 43 | 67 | 43 | 90 | 91 |
| Flexural rigidity, kg./cm. (ASTM D-747-50) at 23° C. | 6,500 | 6,400 | 11,200 | 6,100 | 5,900 |
| Izod impact strength, kg. cm./cm². (ASTM D-256-54T) at 23° C. | 53 | 52 | 3.2 | 48 | 51 |
| Brittle temperature | −28 | −27 | +1 | −25 | −32 |

Note:
Composition A: Polypropylene (70)-low density polyethylene (15)-ethylene-propylene copolymer (15).
Composition B: Polypropylene (70)-high density polyethylene (15)-ethylene-propylene copolymer (15).
Composition C: Polypropylene (100).
Composition D: Polypropylene (70)-high density polyethylene (15)-EPR (trade name Dutral N) (15).
Composition E: Polypropylene (70)-amorphous ethylene-propylene copolymer (30).
Numerals in the parentheses are percent by weight.

References Cited

UNITED STATES PATENTS 3,256,367  6/1966  Jayne.
3,262,992  7/1966  Holzer et al.
3,281,501  10/1966 Coats et al.
3,354,239  11/1967 Short.
3,378,607  4/1968  Jones et al.

FOREIGN PATENTS 958,079  5/1964  Great Britain.
990,717  4/1965  Great Britain.

MURRAY TILLMAN, Primary Examiner

C. J. SECCURO, Assistant Examiner

U.S. Cl. X.R.

260—897

PC-1050
(5/69)

UNITED STATES PATENT OFFICE
CERTIFICATE OF CORRECTION

Patent No. 3,487,128     Dated December 30, 1969

Inventor(s) OKAZAKI et al

It is certified that error appears in the above-identified patent and that said Letters Patent are hereby corrected as shown below:

In the Abstract of Disclosure, line 5 and in the Claims, Claim 1, line 2 should read -- block copolymer-- not "black copolymer."

SIGNED AND
SEALED
JUL 14 1970

(SEAL)
Attest:

Edward M. Fletcher, Jr.
Attesting Officer

WILLIAM E. SCHUYLER, JR.
Commissioner of Patents